United States Patent
Weidner

(10) Patent No.: US 8,824,668 B2
(45) Date of Patent: Sep. 2, 2014

(54) COMMUNICATION SYSTEM COMPRISING A TELEPHONE AND A LISTENING DEVICE, AND TRANSMISSION METHOD

(75) Inventor: Tom Weidner, Erlangen (DE)

(73) Assignee: Siemens Medical Instruments Pte. Ltd., Singapore (SG)

( * ) Notice: Subject to any disclaimer, the term of this patent is extended or adjusted under 35 U.S.C. 154(b) by 0 days.

(21) Appl. No.: 13/883,048

(22) PCT Filed: Oct. 28, 2011

(86) PCT No.: PCT/EP2011/069001
§ 371 (c)(1),
(2), (4) Date: May 2, 2013

(87) PCT Pub. No.: WO2012/059428
PCT Pub. Date: May 10, 2012

(65) Prior Publication Data
US 2013/0223621 A1      Aug. 29, 2013

Related U.S. Application Data

(60) Provisional application No. 61/410,024, filed on Nov. 4, 2010.

(30) Foreign Application Priority Data

Mar. 25, 2011    (DE) .......................... 10 2011 006 148

(51) Int. Cl.
*H04M 1/00* (2006.01)
*H04M 9/00* (2006.01)
*H04M 1/60* (2006.01)
*H04R 25/00* (2006.01)
*H04R 1/10* (2006.01)

(52) U.S. Cl.
CPC ............ *H04M 1/6033* (2013.01); *H04R 25/453* (2013.01); *H04R 25/558* (2013.01); *H04R 25/353* (2013.01); *H04R 1/1083* (2013.01)
USPC .................... 379/428.02; 379/430; 455/569.1

(58) Field of Classification Search
USPC .......... 379/428.02, 430, 419, 420.01–420.04; 381/312, 324, 316; 455/569.1, 569.2, 455/575.2, 90.1
See application file for complete search history.

(56) References Cited

U.S. PATENT DOCUMENTS

| | | |
|---|---|---|
| 7,248,711 B2 | 7/2007 | Allegro et al. |
| 7,813,931 B2 | 10/2010 | Hetherington et al. |
| 2004/0077382 A1* | 4/2004 | Verity ........................ 455/569.1 |

(Continued)

FOREIGN PATENT DOCUMENTS

| | | |
|---|---|---|
| EP | 1441562 A2 | 7/2004 |
| EP | 2071874 A1 | 6/2009 |

(Continued)

*Primary Examiner* — Tuan D Nguyen
(74) *Attorney, Agent, or Firm* — Laurence A. Greenberg; Werner H. Stemer; Ralph E. Locher

(57) ABSTRACT

A communications system is configured to reduce the risk of feedback artifacts and contains a telephone device and a listening device. Accordingly, the communication system is thus provided, in which the signal processing in the telephone device is tuned to the listening device and the listening device is configured to process the voice and data signal inversely to the signal processing. Before the acoustic signal is transmitted from the telephone to the listening device, a frequency compression can thus be carried out, and in the listening device an inverse frequency compression can be carried out. This reduces feedback artifacts.

14 Claims, 2 Drawing Sheets

(56) References Cited

U.S. PATENT DOCUMENTS

| | | |
|---|---|---|
| 2004/0087352 A1* | 5/2004 | Laderman .................. 455/575.2 |
| 2004/0175010 A1 | 9/2004 | Allegro et al. |
| 2005/0283263 A1 | 12/2005 | Eaton et al. |
| 2007/0082612 A1 | 4/2007 | Valve et al. |
| 2009/0154742 A1 | 6/2009 | Rasmussen |
| 2010/0184487 A1* | 7/2010 | Takada ........................ 455/569.1 |
| 2011/0230239 A1* | 9/2011 | Ueda et al. .................... 455/570 |

FOREIGN PATENT DOCUMENTS

| | | |
|---|---|---|
| GB | 1597501 A | 9/1981 |
| WO | 0154458 A2 | 7/2001 |

* cited by examiner

COMMUNICATION SYSTEM COMPRISING A TELEPHONE AND A LISTENING DEVICE, AND TRANSMISSION METHOD

BACKGROUND OF THE INVENTION

Field of the Invention

The present invention relates to a communication system comprising a telephone device for conducting a telephone conversation and a hearing apparatus for wearing in or on the ear and for emitting stimuli which can be perceived by hearing, wherein a useful signal in the telephone device is subjected to signal processing and is transmitted acoustically to the hearing apparatus. The present invention also relates to a method for acoustically transmitting a useful signal from a telephone device to a hearing apparatus.

A hearing apparatus is here taken to mean any sound-emitting device, or device emitting other stimuli which can be perceived by hearing, which can be worn in or on the ear, in particular a hearing aid, headset, headphones and the like. Furthermore, a telephone device is here taken to mean any telephone apparatus, in particular a mobile phone, a cordless phone, a corded phone and the like.

Hearing aids are wearable hearing apparatuses that are used to support the hard of hearing. Different hearing aid designs, such as behind-the-ear hearing aids (BTE), hearing aid with an external receiver (RIC: receiver in the canal) and in-the-ear hearing aids (ITE), for example also concha hearing aids or completely-in-canal hearing aids (ITE, CIC) are provided in order to accommodate the numerous individual requirements. The hearing aids listed by way of example are worn on the outer ear or in the auditory canal. However, bone conduction hearing aids, implantable or vibrotactile hearing aids are also commercially available, moreover. In this case damaged hearing is either mechanically or electrically stimulated.

In principle hearing aids have as their fundamental components an input converter, an amplifier and an output converter. The input converter is usually a sound pick-up, for example a microphone and/or an electromagnetic receiver, for example an induction coil. The output converter is usually implemented as an electroacoustic converter, for example a miniature loudspeaker, or as an electromechanical converter, for example a bone conduction receiver. The amplifier is conventionally integrated in a signal processing unit. This basic construction is shown in FIG. 1 using the example of a behind-the-ear hearing aid. One or more microphone(s) 2 for receiving the sound from the surroundings are fitted in a hearing aid housing 1 for wearing behind the ear. A signal processing unit 3, which is also integrated in the hearing aid housing 1, processes the microphone signals and amplifies them. The output signal of signal processing unit 3 is transmitted to a loudspeaker or receiver 4 which outputs an acoustic signal. The sound is optionally transmitted via a sound tube, which is fixed to an otoplastic in the auditory canal, to the eardrum of the wearer of the aid. The energy supply to the hearing aid, and in particular that of signal processing unit 3, takes place by way of a battery 5 likewise integrated in the hearing aid housing 1.

Use of a telephone often presents a difficult situation for the wearer of a hearing aid. In particular there are difficulties relating to feedback if the wearer of a hearing aid uses a telephone.

Previously it has by way of example been possible for a hearing aid to detect a telephone situated in the immediate vicinity. This is achieved by special sensors inside the hearing aid, for example magnetic field sensors. If a magnet by way of example is secured to the telephone, the hearing aid can detect this magnet or the telephone. As soon as the telephone has been detected the hearing aid can switch into a special program (for example a telephone program) or it can change its settings such that feedback phenomena are minimized. The successes of feedback reduction are limited, however, since the sound quality of typical telephones is not optimum for hearing aid applications and a lower amplification or a limited bandwidth reduces intelligibility still further.

A hearing aid system is known from the publication U.S. 2005/0283263 A1 which comprises a hearing aid and a telephone. The telephone and the hearing aid are wirelessly connected by a short range network.

A method for frequency transposition for a hearing aid or a communication device is also described from document U.S. Pat. No. 7,248,711 B2. The low frequencies are substantially linearly shifted while the higher frequencies are increasingly shifted. Higher frequencies can therefore be shifted into lower frequency ranges.

BRIEF SUMMARY OF THE INVENTION

The object of the present invention is to reduce the feedback problems in a communication device comprising a telephone device and a hearing apparatus.

According to the invention this object is achieved by a communication system comprising a telephone device for conducting a telephone conversation and a hearing apparatus for wearing in or on the ear and for emitting sound, wherein a useful signal is subjected to signal processing in the telephone device and is acoustically transmitted to the hearing apparatus, wherein signal processing in the telephone device is tuned to the hearing apparatus and the hearing apparatus is designed to process the useful signal inversely to the signal processing.

Furthermore, according to the invention a method is provided for transmitting a useful signal from a telephone device, which is designed for conducting a telephone conversation, to a hearing apparatus, which is designed for wearing in or on the ear and for emitting sound, by subjecting a useful signal in the telephone device to signal processing and transmitting the useful signal acoustically to the hearing apparatus, wherein signal processing in the telephone device is tuned to the hearing apparatus, and in the hearing apparatus the useful signal is processed inversely to the signal processing in the telephone device.

The useful signal is therefore advantageously transmitted acoustically from the telephone device to the hearing apparatus, with the useful signal previously having been subjected to a specific signal processing in the telephone device. In the hearing apparatus this specific signal processing is then reversed by corresponding inverse signal processing. As an acoustic output signal of the hearing apparatus the user of the hearing apparatus then receives a signal, which corresponds to an output signal of the telephone device, which would not have been subjected to specific signal processing. The output signal of the hearing apparatus is acoustically changed with respect to the input signal (irrespective of any amplification of the hearing apparatus) by the specific inverse signal processing. If the output signal of the hearing apparatus is now fed back at the input (the microphone) of the hearing apparatus, there is a lower probability of constructive overlaying of the two signals than in the case where input signal and output signal are more alike. Feedback phenomena are reduced therefore by the specific signal processing in the telephone device and the corresponding specific, inverse signal processing in the hearing apparatus.

Signal processing in the telephone device preferably includes a frequency compression and signal processing in the hearing apparatus a corresponding frequency expansion. Conversely, a frequency expansion can also occur in the telephone device and a frequency compression in the hearing apparatus. Alternatively or additionally a frequency shift and a corresponding frequency back-shift can also occur in the hearing apparatus specifically for feedback reduction in the telephone device. Likewise alternatively or additionally signal processing in the telephone device can include signal amplification and signal processing in the hearing apparatus can include corresponding signal damping. In each case there is therefore a clear change in the acoustic signal to be transmitted, so no feedback problems arise with the output signal of the hearing apparatus therefore.

Furthermore, it is particularly advantageous if the telephone device is designed such that data relating to a property of signal processing is transmitted in the telephone device with an acoustic signal which is transmitted from the telephone device to the hearing apparatus. Therefore, by way of example, a parameter relating to the frequency compression can be transmitted to the hearing apparatus encoded, so the hearing apparatus adjusts its frequency expansion accordingly. The system is correspondingly flexible due to the transmission of this additional information.

An acoustic control signal, which is preferably inaudible, can also be transmitted by the telephone device to the hearing apparatus, and the hearing apparatus is designed such that it activates inverse signal processing if it receives the acoustic control signal. It can thus be ensured that the hearing apparatus only switches on inverse signal processing if it receives an input signal from a telephone device which executes the corresponding specific signal processing for feedback reduction ("feedback reduction" is here taken to mean the reduction of artifacts which occur during feedback, for example feedback whistling).

According to another embodiment the telephone device is automatically detected by the hearing apparatus, and inverse signal processing is activated in the hearing apparatus as a function of the detection result. It is not necessary for the telephone device to actively send a signal to the hearing apparatus for this purpose. Instead it is sufficient by way of example if the hearing apparatus detects, by way of example with a magnetic field sensor, a magnet of the telephone device and therefore indirectly detects the telephone.

Furthermore, the hearing apparatus and the telephone device can be designed to determine algorithms for signal processing and inverse signal processing and to adjust them to each other. The two devices therefore negotiate the way in which the useful signal is changed for acoustic transmission. The hearing apparatus then automatically appropriately reverses this change. A very flexible communication system may thus be achieved in which the components are mutually coordinated.

The interaction of hearing apparatus and telephone device can also be controlled by what is known as an app. The term app (short for application) basically denotes any application program which can be executed by a computer. In the present case an application for modern telephone devices, such as smartphones and tablet computers, is meant in particular. Control by way of an app can take advantage of the user interface of the telephone device and enable particularly intuitive and efficient user control.

The present invention will be described in more detail with the aid of the accompanying drawings, in which:

DESCRIPTION OF THE INVENTION

The exemplary embodiments described in more detail below are preferred embodiments of the present invention.

Figure 2:
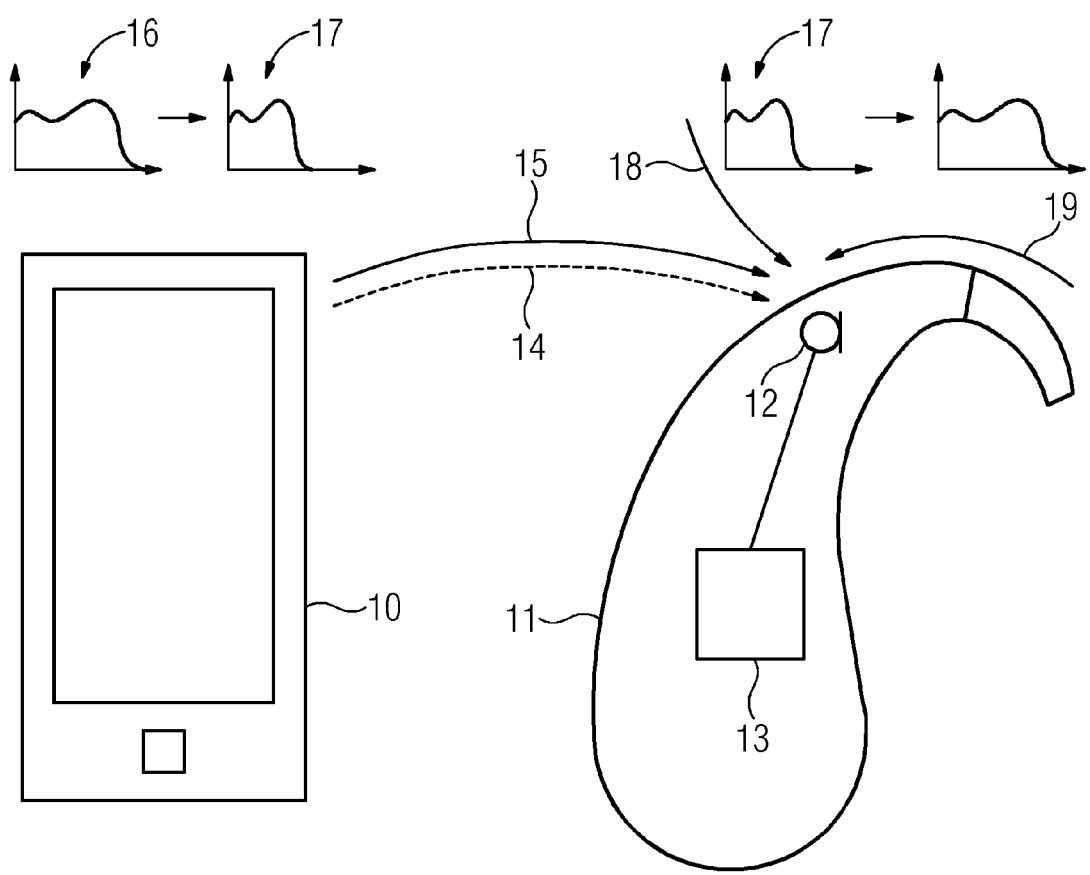
FIG. 2 shows a diagram to illustrate an inventive communication system.

The inventive communication system shown in FIG. 2 comprises as a telephone device a mobile phone 10 and as a hearing apparatus a hearing aid 11 (here a behind-the-ear hearing aid). Even if a mobile phone is chosen as the telephone device in the example, a fixed network phone by way of example, corded or cordless, may also be used as the telephone device. Similarly, instead of the behind-the-ear hearing aid, an in-the-ear hearing aid or optionally also a headset or headphones may be used as the hearing apparatus.

Figure 1:
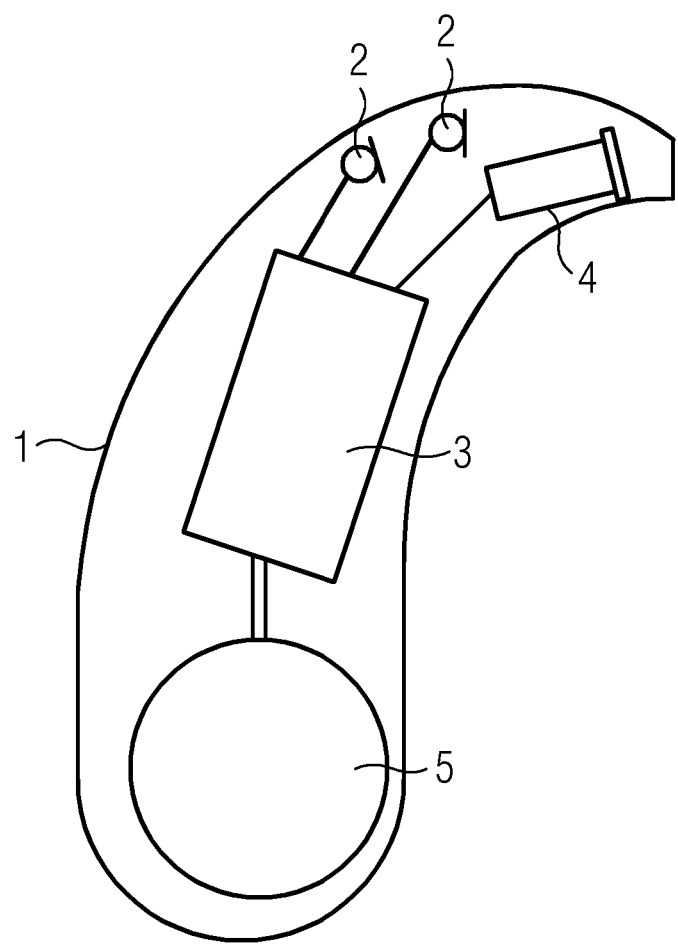
FIG. 1 shows a schematic diagram of a hearing aid according to the prior art.

The hearing aid 11 substantially has the same signal processing components as the hearing aid in FIG. 1. Reference is therefore made to the description of FIG. 1 in this regard. For the sake of an overview, however, only the microphone 12 and signal processing device 13 are illustrated in FIG. 2. The microphone 12 picks up on the ambient noise, converts it into a corresponding electrical signal and conducts this onwards on to signal processing 13. The microphone 12 of the hearing aid 11 can also pick up specific sound signals 13 (=control signal) from the mobile phone 10. These specific sound signals are registered in signal processing device 13 and the hearing aid 11 switches into corresponding predetermined states as a function of these specific sound signals.

For the present invention the transmission of the useful signal 15 acoustically between the mobile phone 10 and the hearing aid 11 is of crucial importance, however. The useful signal to be acoustically transmitted is pre-processed in the mobile phone 10 (telephone device in general). This pre-processing is used solely for the purpose of emitting a different sound signal to that which is to be heard by the wearer of the hearing aid or user of the hearing apparatus. This useful signal 15 changed by pre-processing is therefore acoustically transmitted to the hearing aid 11. Inverse signal processing occurs therein and this reverses the pre-processing of the mobile phone 10. The output signal of the hearing aid 11, aside from any amplification by the hearing aid, then corresponds to the signal which would be output by the mobile phone 10 without the pre-processing.

In a specific example a useful signal, which is to be emitted by the mobile phone 10 in a mode without the hearing aid, has a spectrum 16. This signal is not directly acoustically output, however, but previously subjected to a frequency compression, so a signal with the compressed spectrum 17 results. This signal with the compressed spectrum 17 is then emitted by the mobile phone 10 and transmitted acoustically as a useful signal 15 to the hearing aid 11. In addition, the telephone 10 can also generate one or more specific sound or communication signal(s) 14 (for example a pilot tone) which is/are transmitted from the telephone 10 to the hearing aid 11 via the same acoustic channel as the useful signal 15.

The useful signal 15 entering the hearing aid 11 therefore has the compressed spectrum 17. The hearing aid 11 or its signal processing then carries out an inverse frequency compression, i.e. a frequency expansion, of all of the input signals. Apart from the useful signal 15 this also includes noise signals 18 from the surroundings and feedback signals 19 from the sound output of the hearing aid 11. The inverse compression (generally inverse signal processing with respect to signal processing in the mobile phone carried out specifically for transmission) converts the useful signal back into a normal telephone signal with the decompressed spectrum 16. This processing in the hearing aid 11 decompresses all other acoustic signals 18, 19 from the surroundings or from the feedback. The acoustic feedback is therefore greatly reduced, together with the feedback compensator of the hearing aid 11 (not illustrated in FIG. 2).

In a specific embodiment the inverse frequency compression occurs only if the hearing aid 11 detects a specific communication signal 14 (for example the pilot tone). There are other possibilities, however, of activating the inverse frequency compression in the hearing aid 11. By way of example the hearing aid 11 has a magnetic field sensor which detects the magnetic field of a loudspeaker of the mobile phone 10 or a small magnet, which is provided on the mobile phone 10. In the event of detection, inverse frequency compression is then activated in the hearing aid 11. Other activation possibilities, which are known by way of example from automatic switching of a hearing aid into a phone mode, can also be used here.

The communication signal(s) 14, which are transmitted from the mobile phone 10 to the hearing aid 11 in addition to the useful signal 15, can also carry information about the type of frequency compression in the telephone by way of example. Using this information the hearing aid 11 can then adjust the inverse algorithm accordingly.

The telephone 10 and the hearing aid 11 therefore form a combined communication system here to enable improved telephone conversation for a person with impaired hearing. The technical advantages of both devices are used for a single application. In particular the frequency compression in the telephone 10, together with the inverse frequency compression in the hearing aid 11, significantly minimizes feedback since the feedback signals 19 occur uncompressed at the microphone 12 while the useful signal 15 is compressed. Considerable advantages result for the wearer of the hearing aid as a result.

The combination of frequency compression in the telephone 10 and inverse frequency compression in the hearing aid 11 maintains the original sound quality of the telephone signal for the wearer of the hearing aid. Furthermore, the communication signals 14 of the output sound of the telephone 10 can synchronize the two devices 10, 11 with regard to optimum setting of the algorithms. For this purpose the two devices can automatically negotiate by way of example an appropriate protocol or appropriate processing algorithm. Of course these specific communication signals are acoustically transmitted such that they are not audible.

Further exemplary embodiments will be described in more detail below. By way of example, according to one development the specific signal processing, in particular the frequency compression, in the telephone or the telephone device can be manually activated as required by the telephone user by means of software installed for this purpose. Alternatively the activation can of course occur automatically if, by way of example, the telephone "detects" a hearing aid wearer in its vicinity. If the frequency compression is then manually or automatically activated, as described above, inverse frequency compression occurs in the hearing aid and the original telephone sound is emitted at the hearing aid output together with the modified ambient noise (including the modified feedback sound). The software required in the telephone device for specific signal processing can be installed by way of example by the user as an additional software program.

The above exemplary embodiments have always been described in connection with frequency compression in the telephone device and inverse frequency compression in the hearing apparatus. Instead of or in addition to frequency compression, a frequency shift by way of example may also occur as specific signal processing or pre-processing in the telephone device. A corresponding back-shift then occurs in the hearing apparatus as inverse signal processing. A frequency expansion of the useful signal can likewise occur in the telephone device and a corresponding compression (=inverse expansion) in the hearing apparatus.

A combination of frequency compression and frequency shift in the telephone device can occur in such a way that the useful or telephone signal modified following this signal processing is in a frequency range in which only a few natural sound components are located. A back-shift and an expansion of the signal frequencies in the hearing apparatus then eliminate most sound components 18, 19 from the surroundings, and this significantly improves intelligibility during the telephone conversation.

Instead of or in addition to frequency compression in the telephone device, the useful signal can be amplified by the telephone device beyond a predefined normal level as well to improve the signal-to-noise ratio for the microphone of the hearing apparatus or to compensate the performance of the output converter of the telephone (for example compensate the low-pass function).

The invention claimed is:

1. A communication system, comprising:
   a telephone device for conducting a telephone conversation; and
   a hearing apparatus to be worn on a head of a user, wherein a useful signal is subjected to signal processing in said the telephone device and is acoustically transmitted to said hearing apparatus, the signal processing in said telephone device is tuned to said hearing apparatus and said hearing apparatus processing the useful signal inversely to the signal processing.

2. The communication system according to claim 1, wherein the signal processing in said telephone device includes a frequency compression and the processing in said hearing apparatus includes a corresponding frequency expansion.

3. The communication system according to claim 1, wherein the signal processing in said telephone device includes a frequency expansion and the processing in said hearing apparatus includes a corresponding frequency compression.

4. The communication system according to claim 1, wherein the signal processing in said telephone device includes a frequency shift and the processing in said hearing apparatus includes a corresponding frequency back-shift.

5. The communication system according to claim 1, wherein the signal processing in said telephone device includes signal amplification and the processing in said hearing apparatus includes corresponding signal damping.

6. The communication system according to claim 1, wherein said telephone device is configured such that data relating to a property of the signal processing is transmitted in said telephone device with an acoustic signal which is transmitted from said telephone device to said hearing apparatus.

7. The communication system according to claim 1, wherein an acoustic control signal can be transmitted by said telephone device to said hearing apparatus, and said hearing apparatus activates inverse signal processing if said hearing device receives the acoustic control signal.

8. The communication system according to claim 1, wherein said telephone device can be automatically detected by said hearing apparatus, and inverse signal processing is activated in said hearing apparatus as a function of a detection result.

9. The communication system according to claim 1, wherein said hearing apparatus and said telephone device determine algorithms for the signal processing and an inverse signal processing and to adjust them to each other.

10. The communication system according to claim 1, wherein the signal processing in said telephone device can be activated and deactivated by the user.

11. The communication system according to claim 10, wherein activation and deactivation can be performed by means of a software program installed on said telephone device.

12. The communication system according to claim 1, wherein the signal processing can be installed in said telephone device by the user as an additional software program.

13. The communication system according to claim 7, wherein the acoustic control signal is an inaudible control signal.

14. A method for transmitting a useful signal from a telephone device for conducting a telephone conversation to a hearing apparatus, which can be worn on a head of a user, which comprises the steps of:
 subjecting the useful signal in the telephone device to signal processing;
 transmitting the useful signal acoustically to the hearing apparatus;
 tuning the signal processing in the telephone device to the hearing apparatus; and
 processing, in the hearing apparatus, the useful signal inversely to the signal processing.

\* \* \* \* \*